United States Patent
Yeh

(10) Patent No.: US 6,690,929 B1
(45) Date of Patent: Feb. 10, 2004

(54) DYNAMIC QUALITY-OF-SERVICE AND PRICING IN COMMUNICATION SYSTEM

(75) Inventor: Hsi-Jen James Yeh, Covina, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/128,029

(22) Filed: Aug. 3, 1998

(51) Int. Cl.[7] ............................................. H04M 11/00
(52) U.S. Cl. ...................... 455/406; 455/407; 455/437; 455/453; 379/114.01
(58) Field of Search ............................... 455/406, 407, 455/408, 459, 445, 405, 437, 414, 432; 379/114, 130, 131, 132

(56) References Cited

U.S. PATENT DOCUMENTS

| | | | | |
|---|---|---|---|---|
| 5,303,297 A | * | 4/1994 | Hillis | 455/406 |
| 5,448,759 A | * | 9/1995 | Krebs et al. | 455/517 |
| 5,594,739 A | * | 1/1997 | Lemieux | 570/350 |
| 5,757,784 A | * | 5/1998 | Liebowitz et al. | 370/321 |
| 5,794,140 A | * | 8/1998 | Sawyer | 455/408 |
| 5,915,214 A | * | 6/1999 | Reece et al. | 455/406 |
| 5,943,624 A | * | 8/1999 | Fox et al. | 455/556 |
| 5,974,308 A | * | 10/1999 | Vedel | 455/407 |
| 6,101,379 A | * | 8/2000 | Rahman et al. | 455/406 |
| 6,347,224 B1 | * | 2/2002 | Smyth et al. | 455/406 |
| 6,430,408 B1 | * | 8/2002 | Dorenbosch | 455/414 |

* cited by examiner

Primary Examiner—Nay Maung
Assistant Examiner—Tilahun Gesesse

(57) ABSTRACT

Enhanced system operation is realized with a method, and apparatus for carrying out the method, which negotiates with a customer for a Quality-of-Service level that the customer gets in a connection for a price that the customer is willing to pay. The negotiation is repeated throughout the time the connection exists. In a cellular environment, the QoS is negotiated when a mobile unit initiates a call, at regular intervals during the call (when changes in traffic conditions call for a renegotiation), and when the mobile unit is handed off from one cell to another cell. To prepare for its end of the negotiations, the service provider collects information concerning the level at which its resources are being utilized and determines its ability to guarantee a particular QoS level. This information is continuously updated and combined with historical data to calculate price data.

42 Claims, 2 Drawing Sheets

DYNAMIC QUALITY-OF-SERVICE AND PRICING IN COMMUNICATION SYSTEM

BACKGROUND

This invention relates to cellular systems and, more particularly, to dynamic association of pricing with service that is provided at a given Quality-of-Service (QoS) level.

Current cellular systems (IS-136, IS-95, GSM and AMPS) have a limited form of differential billing that is based on space and time variations. That is, a different billing rate applies as a mobile terminal roams from cells served by its home area to cells outside its home area. Also, a different billing rate is applied based on time of day, with a higher rate being charged at peak-hour time.

SUMMARY

I have recognized that these circumstances are not, however, the only circumstances where different billing rates would benefit both the user and the provider.

For example, capacity utilization can vary greatly for cells within the same Mobile Switching Center (MSC). Therefore, as a mobile unit moves from one cell to another, the resource utilization by the cell into which the mobile unit enters may differ greatly from the resource utilization of the cell from which the mobile unit exits. If the mobile unit was using a large amount of bandwidth in a low utilization cell, its entrance into a high utilization cell can lead to a substantially increased probability of call blocking in the arrived cell. This represents a circumstance where differential billing might be desirable.

Also, capacity within the cell varies over time. Consequently, a mobile unit that employs a high-bandwidth connection during a low cell utilization period might represent a greater burden to the cell during a high cell utilization period because the probability of blocked calls increases as the utilization increases. This also represents a circumstance where differential billing might be desirable.

The difference between the circumstances where different billing rates are currently applied and the above-mentioned circumstances where different billing rates might be desirable is that the latter circumstances are sensitive to actual real time traffic levels.

There is presently no mechanism in the signaling protocol between the base stations (BS) and the mobile units (MS) that allows pricing negotiations. Yet, enhanced system operation for both the provider and the customer can be gained by providing an appropriate protocol and by engaging in dynamic price setting.

Enhanced system operation is realized with a method, and apparatus for carrying out the method, which negotiates with the customer a Quality-of-Service level that the customer gets in a connection and the price the customer agrees to pay therefor. The negotiation may be repeated one or more times throughout the period that the connection exists. The rate and paid by the customer or the QoS provided to the customer change as a result of the negotiation. While from the customer's perspective the negotiation relates to the combination of QoS level and price, from the service provider's perspective the promise of a QoS is but a mechanism for controlling network load and, in the process, perhaps maximizing profit. One embodiment of the invention, for example, in a cellular environment, the QoS may be negotiated when a customer's mobile unit initiates a call, at regular intervals during the call, when changes in traffic conditions call for a renegotiation, and when the mobile unit is handed off from one cell to another cell. To prepare for its end of the negotiations, the service provider collects information concerning the level at which its resources are being utilized and determines its ability to guarantee a particular QoS level. This information is continuously updated and combined with historical data to calculate price data.

DETAILED DESCRIPTION

The system disclosed herein provides service to customer communication terminals with a given, dynamically negotiated, Quality-of-Service level. The following discussion centers on mobile units, but it should be understood that the principles disclosed herein are applicable to other arrangements where it is beneficial to modulate the load that is presented to the network by a terminal unit. For example, the bandwidth that is given to a connection over a data network can be advantageously modulated to accommodate the network's load. Even the load of the conventional analog network, which is connection-oriented, can be modulated by inducing people to continue, or discontinue, their calls.

One key principle disclosed herein is that billing rates are negotiated on a real-time basis. Another key principle disclosed herein is that the control over network traffic load is based on a dynamic renegotiation of billing rates, in a true market economy fashion. What is meant by the term "network traffic load" is network traffic load relative to the maximum traffic load that the network can carry. It is noted that both factors can vary. What is meant by the term "dynamic renegotiation" is negotiation that is repeated at least at some selected rate, for example, every 10 minutes or less. Yet another key principle disclosed herein is that billing rates are negotiated in a manner that is sensitive to current and extrapolated traffic level. Still another key principle disclosed herein is that, from the customer's perspective, what is effected is a QoS level guarantee.

In a cellular environment that is discussed below, the QoS is negotiated when a customer's mobile unit initiates a call, at regular intervals during the call (when changes in traffic conditions call for a renegotiations), and when the mobile unit is handed off from one cell to another cell.

Figure 1:
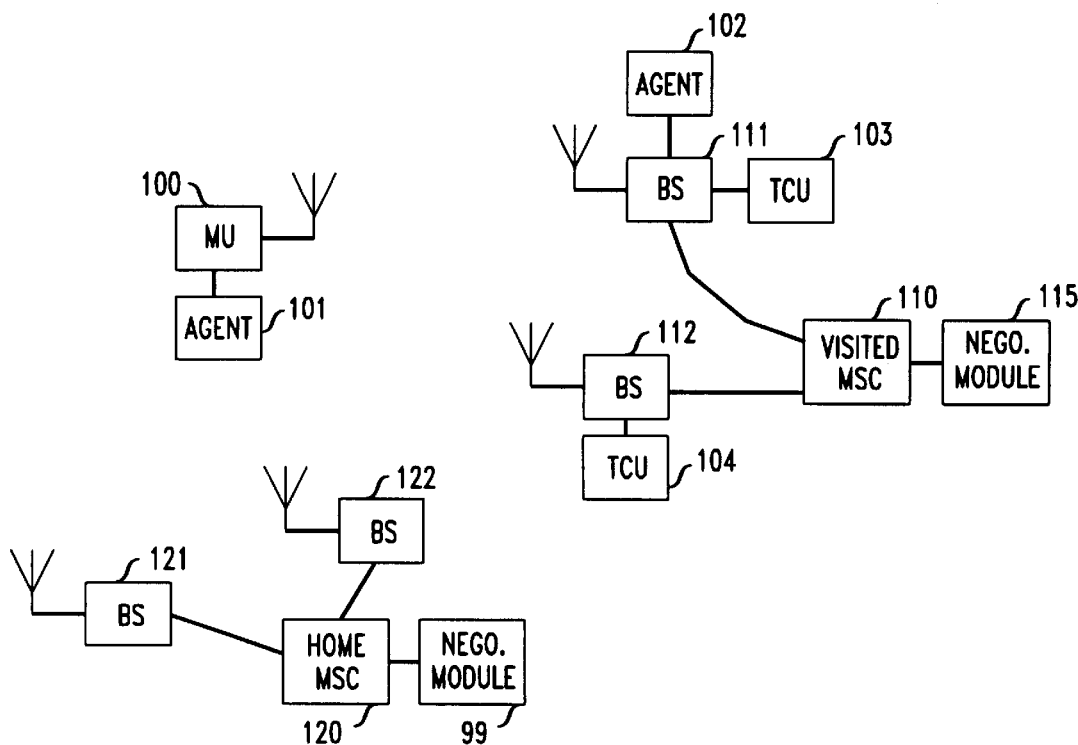
FIG. 1 shows such an arrangement for carrying out the method of this invention in a cellular environment.

FIG. 1 shows such an arrangement for a cellular environment. It includes a mobile unit 100, a home MSC 120 with base stations 121 and 122, and a visited MSC 110 with base stations 111 and 112. To effect the method disclosed herein, the FIG. 1 arrangement also includes two other element types: a traffic measurement unit (TCU) that is associated with each base station (such as TCU 103 that is associated with base station 111), and a negotiation module that is associated with each MSC (such as negotiation module 115 that is associated with MSC 110).

Optionally, an agent module can be associated with the mobile unit and that is how it is shown in FIG. 1 (101). As described in more detail below, the agent module can also reside in the base station (e.g., 102), rather than in the mobile unit.

The QoS negotiation involves the customer who controls mobile unit 100 and who is asked to pay a certain rate, and the service provider that needs to (a) determine what billing rate to ask for, and (b) establish a connection (or continue the existing connection) when the negotiation ends with mutual assent. To prepare for the negotiation, the cellular network collects information concerning the level at which its resources are being utilized, as well as other service-related parameters, and determines its ability to provide service at a particular QoS level. This information is continuously updated by the cell and combined with historical data to arrive at a price vs. QoS relationship. This may take the form of a curve where QoS is the independent variable. In a system like the one illustrated in FIG. 1, this information may be kept within the negotiations modules of the Mobile Service Centers, and the processing necessary for developing the price-QoS curve is carried out in those modules. The actual negotiations with mobile units are also carried out in the MSC negotiation modules. The negotiation module is placed within the MSC of the FIG. 1 arrangement because the MSC is already involved in all hand-offs. A skilled artisan would realize, however, that the negotiation module could have been placed elsewhere, such as in the base stations. In the arrangement illustrated in FIG. 1, the TCUs in the individual base stations periodically update the cell information in the MSC at the initiative of the base stations, or in response to an order from the MSC, as the designer of a particular embodiment desires.

The protocol for the actual negotiations between the mobile unit and the MSC can take on various forms. Cellular systems typically have one dedicated control channel that is responsible for initial call set-up and allocation of the traffic channel. After a traffic channel is acquired, subsequent control signals are sent through a portion of the traffic channel. In the case of IS-136, each base station has a 48.6 kbps shared digital control channel (DCCH) that is used for paging and initial assignment. After the traffic channel is acquired, IS-136 uses the digital traffic channel (DTC) for control signaling, and this channel is a good avenue for the negotiations.

The actual format of the negotiation signals does not form a part of this invention because any agreed-upon signal format would do. For example, the Fast/Slow Associated Control Channels (FACCH/SACCH) physically residing on the DTC are bi-directional control sub-channels that are used for in-call operations. These operations include channel quality measurement and hand-off orders. Negotiation with the base station can take place on these sub-channels.

A similar signaling capability exists for the IS-95 CDMA and GSM systems, where the Access Channel (in IS-95) and Common Control Channel (CCH in GSM) takes the place of the DCCH, and the Traffic Channel (TCH in both IS-95 and GSM) takes the place of DTC. The same type of channel structure should hold true for the RAN part of the proposed UMTS system.

Figure 2:
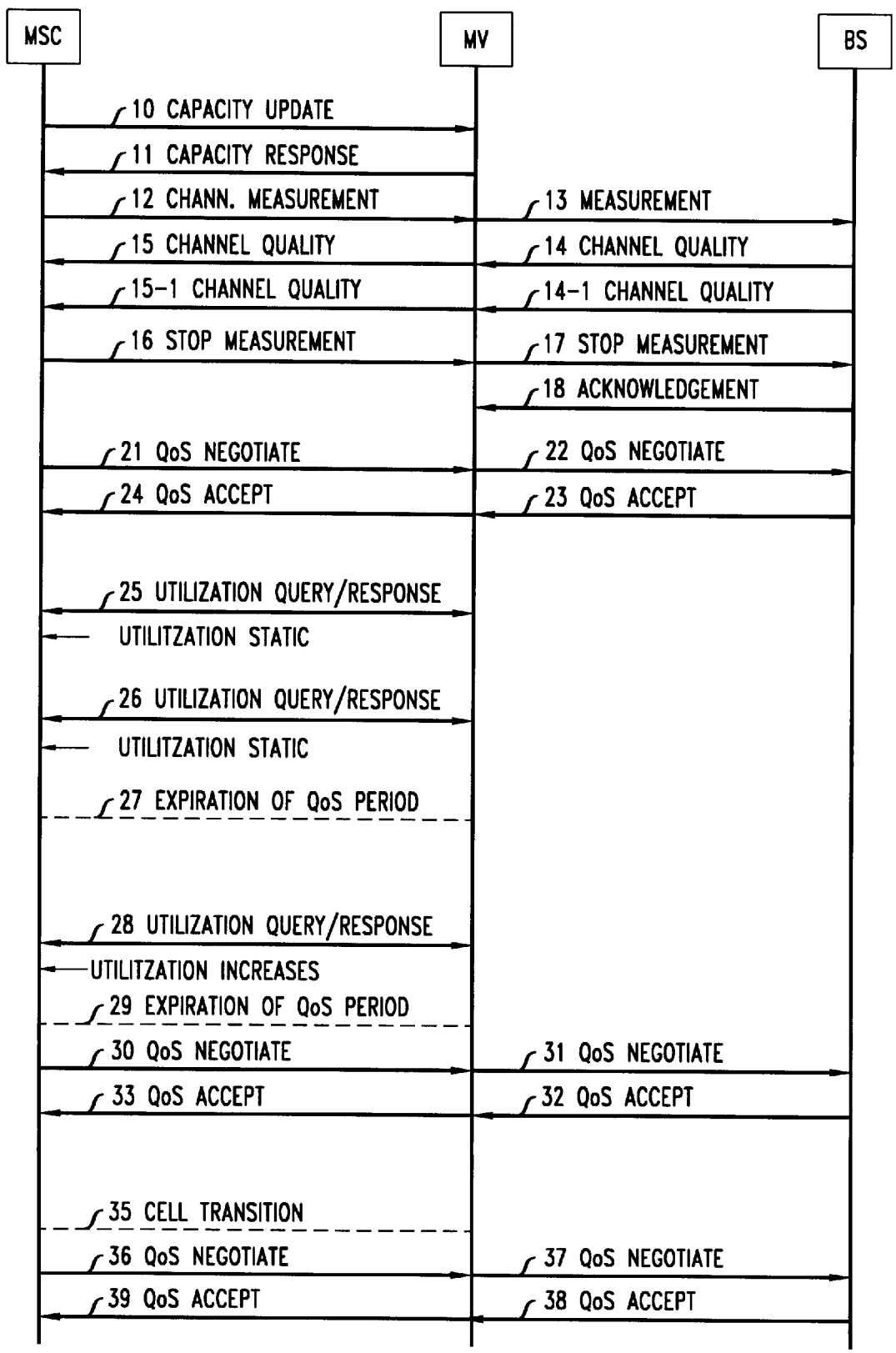
FIG. 2 presents a diagram of the interactions between mobile units, the base stations, and the MSC of FIG. 1.

FIG. 2 presents a diagram of the interactions between mobile units, the base stations, and the MSC of FIG. 1. Signal 10 represents a request from MSC 120 for its base stations, e.g., 111, to send update information regarding the load carried by the cell receiving signal 10, and the overall load that the cell can carry. Signal 11 represents the response from the base station. At another time, perhaps subsequent to the MSC receiving response signal 11, the MSC might request the base station, with signal 12, to make measurements of its transmission environment. This may include noise measurements, multipathing measurements, etc. In order to perform these measurements, the base station may need to send test signals to the mobile units in its cell and have the mobile units report back. This is represented by signal 13. Each mobile unit reports back to the base station (signal 14) and, after all of the requested measurements are made, the base station transmits the collected information to the MSC with signal 15. In some embodiments, the process of measuring the quality of the transmission medium within the cell and sending update information to the MSC is repeated (illustrated in FIG. 1 with signals 14-1 and 15-1) with until the MSC directs the base stations to stop channel measurements. The "stop order" signal is illustrated in FIG. 1 with signal 16 that goes to the base stations, and signal 17 that goes to the mobile unit. An acknowledgement signal 18 returns to base station from the mobile unit.

Following the interval where the MSC obtains updated information from the base stations, the MSC determines what billing rate to apply for requested service. This determination, as indicated above, may be made within the negotiation module. It need not be necessarily a scientific determination, and it can follow whatever policy the service provider chooses to adopt. Needless to say, the policy can change at the service provider's whim. To provide merely a few examples, the policy may treat existing calls more favorably than new calls, it may treat calls differently based on the length of the calls, it may apply a higher rate when the cell is heavily loaded, it may try to maintain a rate for a mobile unit when it crosses to another cell, etc.

A valuable aspect of the ability to set billing rates and to change them dynamically is that system usage can be influenced (even strongly, if desired) by the rates that are chosen. For example, the rate for a new call can be set so high as to discourage essentially all calls, thereby achieving a self-elected blocking. In the case of a downed switch where rerouting of calls is still possible, the rate may be set at high as 10 times the normal rate, to discourage all but very few from making calls or continuing calls. In the case of a condition where it is desired that no calls should be made, the rate can be set at infinity. Traffic load can also be throttled by setting a reasonable low rate for narrower bandwidth but an unreasonably high rate for wide bandwidth, which would, likely, induce active calls to accept a lower bandwidth while continuing their communications.

Figure 3:
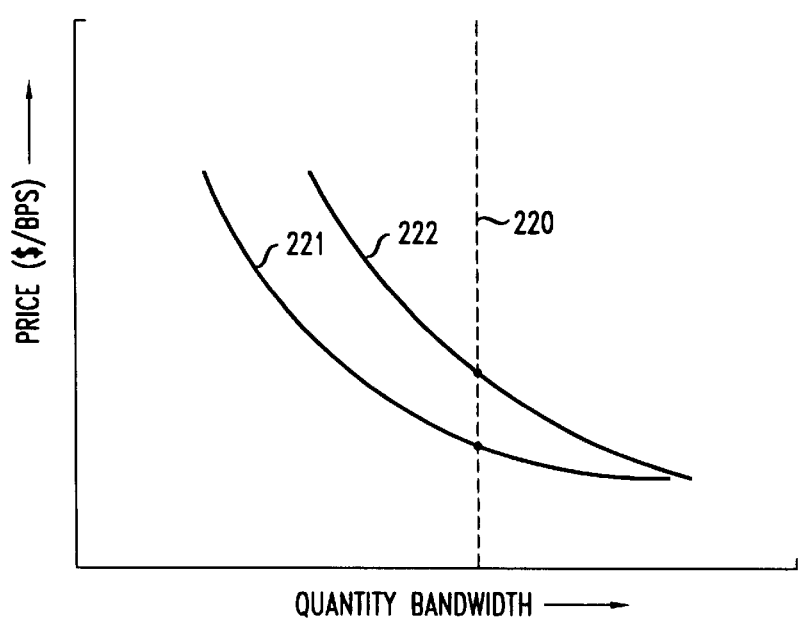
FIG. 3; illustrates the interaction of demand and supply curves that yields a desired billing rate.

The supply curve of cellular capacity is essentially a vertical line because the available resource (bits to be communicated) is fixed. This is shown in FIG. 3 by vertical line 220. Curve 221 is a reasonable rate/QoS curve that the MSC might employ, and the intersection of curve 221 with supply line 220 represents the economically advisable rate that should be charged. When demand increases, such as when more users initiate calls, the demand curve is shifted to the right, as shown in curve 222, yielding a new equilibrium point that is at a higher price than the equilibrium point for the lower demand.

An efficient allocation that is based on market-driven processes should result in an equilibrium price point as shown FIG. 3. However, if the QoS is not renegotiated for the in-call users, a different price is "locked-in" for those users and, therefore, a non-optimal allocation is obtained. The result is that call allowance (the opposite of call blocking) is not well related to the willingness of users to pay. For example, an existing user who is performing video conferencing at a previously negotiated very low price might block a new user who is willing to pay a high price for an important phone call.

Therefore, in accordance with the principles disclosed herein, in addition to a QoS negotiation in the course of initial establishment of a connection, and renegotiations initiated during hand-offs from cell to cell, QoS negotiations with the customer's mobile unit occur repeatedly, as the level of cell utilization fluctuates. It is noted that the repetition intervals may be of fixed duration that is set by the service provider, the duration of intervals may be negotiated between the provider and the mobile unit, the intervals may vary in duration based on time of day or network load conditions, etc. In all instances, the service provider determines whether a renegotiation is in order, before the renegotiation is carried out. If conditions in the cell where the mobile unit is found do not call for a renegotiation, the renegotiation process is advantageously skipped.

To alleviate some of potential user resistance to the fluctuating QoS pricing procedure, the QoS price can be negotiated for a predetermined period of time. For example, the QoS price of a phone conversation can be negotiated for 2 minutes. Since the average holding time for cellular phone conversations is only 90 seconds it means that only a single negotiation needs to take place (as long as the mobile unit does not move to another cell). The negotiated price of a fixed-time QoS guarantee will, most likely, be developed by the service provider from both current cell utilization and historical statistics on cell utilization rates over the negotiated period to reduce signaling overhead. The current information, augmented by the historical data, allow the service provider to extrapolate the state of its network for some preselected next time interval with a high degree of confidence.

Interestingly, the fixed-time pricing that the system provides to the user is similar to financial instruments called swaps. Swaps are contracts that exchange the cash flow of a variable-rate financial asset for that of a fixed-rate asset. There exists a large number of pricing models for swaps, and some of these pricing models can be applied to the fixed-time pricing in the proposed arrangement.

As indicated above, the fixed interval for which a rate is fixed can also be a variable that is subject to negotiations. In general, the longer the negotiated period for a fixed price, the higher the fixed price. This type of pricing is similar to the pricing of adjustable-rate mortgages versus fixed-rate mortgages. The reason for this is that the longer the negotiated period, the harder it is to manipulate demand, because the channels are being tied-up. Additionally, the "premium" will also depend on the number of channels requested. A large number of negotiated channel will lead to increased demand management difficulties compared to a small number negotiated channels.

In FIG. 2, one negotiation process is illustrated with signals 21–24. Through signal 21 the service provider offers a service at some given rate, or offers a menu of services at respective given rates. In the embodiment disclosed in FIG. 1 where the negotiations are with the mobile unit, this offer is communicated to the mobile unit with signal 22. If the unit agrees to the offered service, or to one of the offered services, it returns an acceptance signal 23. That signal is communicated from the base station to the MSC with signal 24, and the negotiation is successfully terminated. The action taken following the reception of signal 24 is, for the sake of the present discussion, the establishment of a connection for the mobile unit.

After the connection is established, a QoS interval clock is initiated. As indicated above, this clock may provide an interval that is fixed, that is variable as a function of the time of day or network load condition, or set pursuant to an agreed-upon interval during the aforementioned negotiation with the mobile unit. Independently of the interval clock, the service provider repeatedly monitors the state of its network. This is illustrated in FIG. 2 with "utilization query/response" signal set 25. This line represents the collection of signals 10–18 that are described above. In the FIG. 2 illustration, the conclusion following the utilization query/response of signal set 25 is that the network's resource utilization level has not materially changed. The same result is illustrated for some later time with utilization query/response signal set 26.

At some time after it is determined, in response to utilization query/response signal set 26, that the network resource utilization has not materially changed, FIG. 2 shows that the interval of QoS interval clock has expired (line 27). Since the network's resource utilization level has not materially changed since the last negotiation, no action is taken other than starting another interval.

Sometime thereafter, according to FIG. 2, when the network again assesses the network's resource utilization level with utilization query/response signal set 28 and a determination is made that the network's resource utilization level has materially changed, the operation is different. Specifically, when the interval of the QoS interval clock expires at line 29, a negotiation session is initiated with signal lines 30–33 that correspond to signal line 21–24. A similar effect results when a cell transition is detected, as shown in FIG. 2 by line 35. That is, a negotiation session is initiated with signal lines 36–39 that correspond to signal line 21–24.

Current cellular system operates on the principle that it is better to block a new call than drop an existing call during hand-off. This has led to the reservation of some capacity to potential hand-offs in favor of new calls. In other words, new calls may be blocked when capacity is still available because they are reserved for hand-offs. This principle is based on the fact that annoyance to the user is greater for a dropped call than a blocked call. However, the sane principle can be more elegantly incorporated into the system disclosed herein. For an in-call user, either entering a new cell or when the negotiated QoS expires, a discount can be applied to the quoted price versus a new user. In this way, the greater annoyance to the user from a dropped connection can be taken into account properly through a market mechanism, rather than through the potentially inefficient reservation mechanism.

The negotiations between a mobile and a base station are necessarily somewhat different from the negotiation strategy for point-to-point service delivery that covers two mobile units and, perhaps, two different base stations. The point-to-point communication between two mobile units involves two independent negotiations, and that means that the two negotiations must be reconciled with each other. For example, for a video conference connection between two wireless units with time sensitive data (no buffering), the maximum QoS (bit rate) that the connection can deliver is the lowest of the two separate bit rates. In other words, if one of the terminals accepts a 4-channel uplink in a lightly loaded cell, while the other terminal accepts only a 2-terminal downlink in a heavily loaded cell, the 2 additional channels used in the uplink are completely wasted. Because the user should only pay for what is actually being used, a signal must be passed through the network to inform the first user that he needs only to set up a 2-channel connection, regardless of his willingness to pay for a 4-channel uplink. Of course, part of the negotiation might be that the service provider is permitted to set up a lower quality service and charge the user a lower rate. Alternatively, it is also possible for the negotiation to allow one mobile unit to pay for part of the bandwidth that is provided for the other mobile unit, so that the connection is provided with the full bandwidth through an effective subsidy by the party that is willing to pay.

The actual process of negotiations can take on a number of different forms. At least at the beginning of a call, it is not unreasonable to assume that the user of the mobile unit is affirmatively involved in the negotiation. The base station can even sent a voice message that basically says, "the price for a call is xx1 for yy1 type of service, xx2 for yy2 type of service, and xx3 for yy3 type of service. Press 1, 2, or 3 to select the type of service you want." The base station could also merely send a signal that is translated within the mobile unit to the illustrated statement above. A module that, in some sense, is as an agent of the user would carry out such a translation. Such a module would be viewed as a rather simple agent, having very little intelligence. However, more sophisticated user agents can be installed in the mobile unit. The more intelligent user agents can be allowed to make decisions for the user, typically within some preset bounds, and such agents can be effectively used in situations other than initial call-setup negotiations. That is, such a user agent can be effectively used in all of the negotiations contemplated by the approach disclosed herein, including the negotiations that are described above in connection with FIG. 2.

The sophistication of an agent that resides in the mobile unit of a particular embodiment is not a part of this invention. It can be as simple as the user of the mobile units desires it to be, or as complex and intelligent as the system can accommodate. A simple agent would contain tables of prices versus various types of QoS, and time of day over which the mobile terminal will accept offered service. A more sophisticated agent may have sub-modules that will have different characteristics and which the user will be able to choose. For example, the user may choose an sub-module with higher maximum acceptable price points for a time-sensitive wireless file transfer, and choose a sub-module with a lower maximum acceptable rate for during internet browsing. A still more sophisticated agent may operate on the basis of the average maximum price. The agent might have a (very high) "hard" maximum price above which the connection will definitely be refused. However, because the user obtains one monthly bill at the end of the month, and determines the value of his cellular service at that point, the agent can be programmed to keep the average price per minute under a certain level. For example, if the user had made many calls in the first half of the month at prices below the average price level, the agent may temporarily adjust the "soft" maximum price upward to allow higher priced calls. If the user's calling pattern is consistent from month to month and the rates are sufficiently slow varying, the agents can intelligently set the "soft" maximum price at the beginning of the month.

It should be noted that an agent that resides in the mobile unit must interact with the signaling that emanates from the base station and, therefore, the service provider needs to publish the specifications of the protocol that it chooses to adopt. This would allow independent vendors to design agents with varying levels of sophistication.

As indicated above, placing an agent in the mobile unit is not the only available choice. The agent module can be placed in the base stations, as is indicated in FIG. 1 by agent module 102, and it can even be placed in the MSC. If the mobile unit's agent is to reside in the base station (or in a visited MSC), it needs to be placed there from somewhere else. In current cellular systems such as IS-136, a user profile is stored in the user's home MSC. This information is passed to the visited MSC upon registration. The user profile contains preferences and billing information that is necessary for the connection. In accordance with the principles disclosed herein, a negotiation agent can be incorporated into the user profile and be installed in the visited base station or in the visited MSC (as the particular embodiment desires).

Having agents reside on the mobile units has the advantage of great flexibility. Depending on the processing power of the mobile units, agents of different capabilities can be executed on the mobile units. Besides negotiating for each individual connection, application-specific agents can manage all the connections and negotiate as a whole. For example, the agent can lower the QoS bit rate of a video link when a fax is being sent, stealing some of the video bandwidth for the fax. The agents can be integrated seamlessly with the applications on the mobile units.

A word about the QoS Pricing Model. Broadly defined, QoS may be a set of parameters rather than a single parameter. Some of these parameters are harder to define than others. However, many of these parameters can be mapped into a set of physically definable parameters, such as bandwidth and signal-to-noise ratio (SNR). With current TDMA systems, only the bandwidth can be varied, by varying the number of time slots a connection utilizes. With CDMA systems, by changing the processing gain and signal power, the bandwidth and SNR conceptually can be traded-off. Presently, there are at most two independent QoS parameter that can potentially be altered, bandwidth for TDMA and the negotiated time period. However, with future applications and modulation schemes, multiple QoS parameters may be possible.

The operation described above in connection with agent modules works well for negotiating billing rates on a real time basis. In some applications, however, it is desirable for the user of the mobile unit to know when a higher rate has been negotiated. Even though the agent may be programmed to accept a higher rate, users may nevertheless want to know when that higher rate is employed. Accordingly, wherever the agent is residing, it is adapted to provide an alert to the user when the rate changes. Of course, the threshold for providing this alert can be adjusted. When the offered rate is higher than the terminal unit is willing to accept, another alarm is provided which informs the user that the call will be terminated after a given time interval.

It should be apparent to the skilled artisan that various other embodiments other than the one illustrated are possible, and that many modifications to the presented illustrative embodiment are also possible, without departing from the spirit and scope of this invention.

I claim:

1. A method for a service provider providing telecommunication service for a call of a terminal unit, comprising the steps of:

said service provider making an initial offer to provide connection to another party through a transmission channel of at least a given bandwidth, with a promised Quality-of-Service level, in exchange for a specific billing rate for said call;

said terminal unit accepting said offer;

said service provider establishing said connection;

said service provider, at times, while said connection is established, making an offer that comprises a plurality of detailed offers, each of said detailed offers being for a different combination of service parameters, promised Quality-of-Service levels, and billing rates;

said terminal unit accepting said offer; and said service provider maintaining said connection at said new billing rate.

2. The method of claim 1 where said terminal is adapted to operate in accordance with IS-136 and said service provider communicates said offer over the TDC Digital Traffic Channel of said IS-136 protocol, or said terminal is adapted to operate in accordance with IS-95 or GSM protocol and said service provider communicates said offer over the TCH Traffic Channel of said IS-95 and DSM protocols.

3. The method of claim 1 where said step of making said initial offer and said step of accepting in response to said initial offer occur prior to a connection being established for said call.

4. The method of claim 1 where said initial offer comprises a plurality of detailed offers, each of said detailed offers being for a different combination of service parameters, promised Quality-of-Service levels, and billing rates.

5. The method of claim 4 where one of the service parameters is bandwidth allocated to said call.

6. The method of claim 4 where said acceptance selects from said plurality of offers.

7. The method of claim 1 where said offers that are made at times while said connection is established vary with time.

8. The method of claim 1 where the offers that are made at times while said connection is established vary with network load.

9. The method of claim 1 where said times at which said service provider makes an offer are at end of time intervals during which a billing rate is deemed by the service provider to be warranted, making said offer for a new billing rate specific for said call;

said terminal unit accepting said offer; and said service provider maintaining said call at said new billing rate.

10. The method of claim 9 where said intervals are less than 10 minutes.

11. The method of claim 9 further comprising a step of informing a user of said terminal unit when said terminal unit accepts an offer at a higher billing rate.

12. The method of claim 9 further comprising a step of altering Quality-of-Service that is provided to said call.

13. The method of claim 12 further comprising alerting user of said terminal unit of the alteration in Quality-of-Service that is provided to said call.

14. The method of claim 9 where said interval is fixed in duration.

15. The method of claim 9 where said interval is variable with time of day or with traffic load experienced by the service provider.

16. The method of claim 9 where said interval is set by a previous offer made by said service provider.

17. The method of claim 1 where said step of acceptance is made by a user in possession of said terminal unit.

18. The method of claim 1 where said acceptance is made by an agent module that makes an acceptance decision on its own.

19. The method of claim 18 where said agent module resides in said terminal unit.

20. The method of claim 18 where said agent module is installed into said terminal from a database under control of said service provider.

21. The method of claim 1 where said acceptance is made by a software module that makes an acceptance decision on its own.

22. The method of claim 1 further comprising a step of said service provider measuring network traffic load and adjusting the billing rates that it offers in response to said measuring.

23. The method of claim 22 where said network traffic load is a measure of traffic load carried by a network over which said service provider provides said telecommunication service to said call relative to maximum traffic load that said network can carry.

24. The method of claim 23 where, in a cellular environment, said step of measuring comprises said service provider requesting a base station over which said telecommunication service is carried for said call to obtain data relative to traffic load and communicate the data to a Mobile Switching Center under control of said service provider.

25. A method for a service provider providing telecommunication service for a call of a terminal unit, comprising the steps of:

said service provider making an initial offer to provide connection to another party with a promised Quality-of-Service level, in exchange for a specific billing rate for said call, said offer comprising a plurality of detailed offers, each of said detailed offers being for a different combination of service parameters, promised Quality-of-Service levels, and billing rates;

said terminal unit accepting said initial offer;

said service provider establishing said connection;

said service provider, at regular intervals, making an offer for a new billing rate specific for said call;

said terminal unit accepting said offer; and said service provider maintaining said call at said new billing rate.

26. A method for a service provider providing telecommunication service for a call of a terminal unit, comprising the steps of:

said service provider making an initial offer to provide connection to another party through a transmission channel of at least a given bandwidth, with a promised Quality-of-Service level, in exchange for a specific billing rate for said call;

said terminal unit accepting said offer;

said service provider establishing said connection;

said service provider, at times, while said connection is established, making an offer that comprises a plurality of detailed offers, each of said detailed offers being for a different combination of service parameters, promised Quality-of-Service levels, and billing rates;

said terminal unit accepting said offer; and said service provider maintaining said connection at said new billing rate where said acceptance is made by an agent module that makes an acceptance decision on its own and where said terminal unit is a wireless unit and said agent module is obtained from a home Mobile Switching Center of said terminal unit.

27. A method for a service provider providing telecommunication service for a call of a terminal unit, comprising the steps of:

said service provider making an initial offer to provide connection to another party through a transmission channel of at least a given bandwidth, with a promised Quality-of-Service level, in exchange for a specific billing rate for said call;

said terminal unit accepting said offer;

said service provider establishing said connection;

said service provider, at times, while said connection is established, making an offer that comprises a plurality of detailed offers, each of said detailed offers being for a different combination of service parameters, promised Quality-of-Service levels, and billing rates;

said terminal unit accepting said offer;

said service provider maintaining said connection at said new billing rate; and said service provider measuring network traffic load and adjusting the billing rates that it offers in response to said measuring;

where said network traffic load is a measure of traffic load carried by a network over which said service provider provides said telecommunication service to said call relative to maximum traffic load that said network can carry;

where, in a cellular environment, said step of measuring comprises said service provider requesting a base station over which said telecommunication service is carried for said call to obtain data relative to traffic load and communicate the data to a Mobile Switching Center under control of said service provider; and where said step of measuring further comprises said service provider requesting said base station to obtain transmission quality data relative to noise conditions in its cell and communicate the transmission quality data to said Mobile Switching Center.

28. A method for a service provider providing telecommunication service for a call of a terminal unit, comprising the steps of:

said service provider making an offer to provide connection to another party through a transmission channel of at least a given bandwidth, with a promised Quality-of-Service level, in exchange for a specific billing rate for said call;

said terminal unit accepting said offer; and said service provider providing said telecommunication service;

where said offer comprises a plurality of detailed offers, each of said detailed offers being for a different combination of service parameters, promised Quality-of-Service levels, and billing rates, where said steps of service provider making an offer and said terminal unit accepting the offer constitutes a negotiated bargain, and said method further comprises a step of dynamically repeating negotiation of said bargain.

29. A system having a customer apparatus coupled to a telecommunication service provider, comprising:

a control module, under management of a service provider, for making a sequence of offers for providing service at a given Quality-of-Service level to said customer apparatus at an offered billing rate, with at least some of the offers in said sequence comprising a collection of sub-offers, each sub-offer in said collection being for a different combination of service parameters, promised Quality-of-Service levels, and billing rates, and with at least some of the offers in said sequence being made following establishment of service to said customer apparatus and for continuing service as long as said offers in said sequence are accepted; and a module associated with said customer apparatus for receiving said sequence of offers and for accepting each of the offers in said sequence of offers as long as the offers meet requirements preset into said module.

30. The system of claim 29 where said control module makes an offer to initiate said service to said customer apparatus, as well as to continue service to said customer apparatus.

31. The system of claim 29 where said offered billing rate contained in the offers of said sequence of offers fluctuates as a function of traffic load experienced by said service provider that is affected by the provision of service to said customer apparatus, transmission quality of a channel that is used for the provision of service to said customer apparatus, or bandwidth of the provided service, where the or is taken inclusively.

32. The system of claim 29 further comprising a billing module that collects information about traffic load experienced by said service provider that is affected by the provision of service to said customer apparatus and about transmission quality of a channel that is used for the provision of service to said customer apparatus, and develops therefrom billing rate information for said sequence of offers.

33. The system of claim 32 where said control module makes a next offer in said sequence of offers whenever said billing module indicates that the billing rate should be changed.

34. A system having a customer apparatus connected to a telecommunication service provider, comprising:

first means, under management of a service provider, for making an offer to provide connection to anther party, and continuation offers to continue providing said connection, at a given Quality-of-Service level and an offered billing rate that are specified in said continuation offers where said offer, or at least some of said continuation offers comprises a collection of sub-offers, each sub-offer in said collection being for a different combination of service parameters, promised Quality-of-Service levels, and billing rates;

second means associated with said customer apparatus for receiving said continuation offers and for accepting said continuation offers as long as said continuation offers meet requirements preset into said second means; and third means, under control of said service provider and activated when said continuation offers are accepted by said second means, for continuing service to said customer apparatus.

35. The system of claim 34 further comprising fourth means for measuring an amount of available resources that are impacted by said call and transmitting a continuation offer that sets a new billing rate when said fourth means detects, upon completion of a measurement, that the amount of available resources has materially changed from a previous completion of a measurement.

36. The system of claim 35 where said fourth means repetitively performs said measuring.

37. A processor comprising a processing unit, memory, and software modules for carrying out at least some of functions of a telephone apparatus, the improvement comprising:

a first software module that receives from a service provider a package comprising a plurality of offers for service, each of which offers service at a different Quality of Service level, and a second software module that evaluates the offers, and when an offer among said offers meets a set of one or more criteria relating to cost and acceptable Quality of Service level, accepts said offer and sends an acceptance to the service provider.

38. The processor of claim 37 where the telephone apparatus functions that are carried out are functions of a cellular telephone.

39. The processor of claim 37 further comprising means for carrying out remaining functions of said telephone apparatus.

40. The processor of claim 37 further comprising means for carrying out remaining electronic functions of said telephone apparatus.

41. The processor of claim 37 where said software module receives said offer for service from said service provider in the course of establishing communication for said telephone apparatus and at least one other time thereafter, while said telephone apparatus is in communication.

42. A processor system comprising a processing unit, memory, and software modules for carrying out at least some of telephony functions, the improvement comprising:

a first module that receives information about traffic load and develops therefrom a relationship between requested service at a various Quality-of-Service levels and a corresponding billing rates that are to be charged as well as a relationship between in-progress service and a corresponding billing rates that are to be charged, a second module that receives a request for service, a third module that outputs a package comprising a plurality of offers for providing service, or for continuing to provide service, at the various Quality-of-Service levels in exchange for various corresponding billing rates determined by said first module; and a module for receiving a selection of one Quality-of-Service level and a corresponding billing rate from said various Quality-of-Service levels.

\* \* \* \* \*